United States Patent [19]

Suzuki et al.

[11] Patent Number: 4,655,385

[45] Date of Patent: Apr. 7, 1987

[54] METHOD OF BRAZING AN ALUMINUM MATERIAL

[75] Inventors: Kenichi Suzuki; Fusayoshi Miura; Fumio Shimizu, all of Aichi, Japan

[73] Assignee: Kabushiki Kaisha Toyota Chuo Kenkyusho, Japan

[21] Appl. No.: 816,156

[22] Filed: Jan. 3, 1986

[30] Foreign Application Priority Data

Jan. 22, 1985 [JP] Japan .................................. 60-10445

[51] Int. Cl.$^4$ ......................... B23K 1/04; B23K 31/02
[52] U.S. Cl. ...................................... 228/223; 148/24
[58] Field of Search .......................... 228/223, 263.17; 148/26, 24

[56] References Cited

U.S. PATENT DOCUMENTS 2,296,442  9/1942  Horowitz .............................. 148/26
3,117,039  1/1964  Cape ..................................... 148/24
3,330,028  7/1967  Elbreder ............................... 228/223
3,951,328  4/1976  Wallace et al. ...................... 228/207

OTHER PUBLICATIONS

Metals Handbook, vol. 6, 8th Edition, pp. 676-679, 1971.

Primary Examiner—Nicholas P. Godici
Assistant Examiner—Samuel M. Heinrich
Attorney, Agent, or Firm—Berman, Aisenberg & Platt

[57] ABSTRACT

A method of brazing an aluminum material. At least a portion of the material is brought into contact with a coating solution containing cesium and fluorine ions, whereby a chemically coated flux layer composed of cesium fluoroaluminate or a mixture thereof with aluminum fluoride is formed on the surface of the material. Then, the material is heated and joined to another material with a brazing alloy.

8 Claims, 7 Drawing Figures

Co-Kα 2θ (DEGREE)

METHOD OF BRAZING AN ALUMINUM MATERIAL

BACKGROUND OF THE INVENTION

1. Field of the Invention:

This invention relates to a method of brazing an aluminum material, i.e. aluminum or an alloy thereof, by forming a chemically coated flux layer on its surface and heating it.

2. Description of the Prior Art:

Brazing of an aluminum material is usually carried out by employing an Al-Si eutectic alloy having a melting point which is somewhat lower than that of the aluminum material. In order to enable the brazing alloy to combine satisfactorily with the aluminum material, it is necessary to remove any contaminant, such as an oxide film, from the surface of the aluminum material. A flux is applied to the surface of the material to remove any such contaminant therefrom.

The inventors of this invention found potassium pentafluoroaluminate ($K_2AlF_5$) effective as a flux for brazing an aluminum material. A brazing method employing this flux forms the subject matter of Japanese Patent Application No. 191311/1983 corresponding to U.S. Application No. 659,423. It is characterized by forming a flux layer of $K_2AlF_5$ on the surface of the aluminum material by chemical conversion coating. This layer begins to melt at a temperature of about 560° C. and removes an oxide film from the surface of the aluminum material without undergoing any chemical reaction with aluminum.

It has, however, been considered desirable to develop a flux having a lower melting point to enable a lower brazing temperature to reduce the amount of heat required and facilitate the brazing operation. Moreover, $K_2AlF_5$ is not suitable as a flux for brazing an aluminum material containing magnesium, since its chemical reaction with magnesium renders brazing difficult.

SUMMARY OF THE INVENTION

It is, therefore, an object of this invention to provide a method of brazing an aluminum material employing a flux having a lower melting point than that of $K_2AlF_5$, and having a lower reactivity with magnesium.

This object is attained by a method which comprises bringing at least a portion (desired for brazing) of an aluminum material into contact with a coating solution containing cesium and fluorine ions to form a flux layer composed of cesium fluoroaluminate or a mixture of cesium fluoroaluminate and aluminum fluoride on the surface of that material by chemical conversion coating, and heating that portion of the aluminum material to join it to another material with a brazing alloy at a temperature of lower than the melting point of the aluminum material and higher than that of the brazing alloy.

The chemically conversion-coated layer is formed by the reaction of the ions in the solution with the aluminum in the aluminum material. It has a very small thickness and yet is a very effective brazing flux. This flux has a melting point which is lower than that of conventional flux. Therefore, it makes it possible to use a brazing alloy having a lower melting point and facilitates the brazing operation. It is also useful for brazing an aluminum material containing magnesium. The residue which is left after brazing does not cause any corrosion of the aluminum material, since it is hard to dissolve in water.

DETAILED DESCRIPTION OF THE INVENTION

Figure 1:
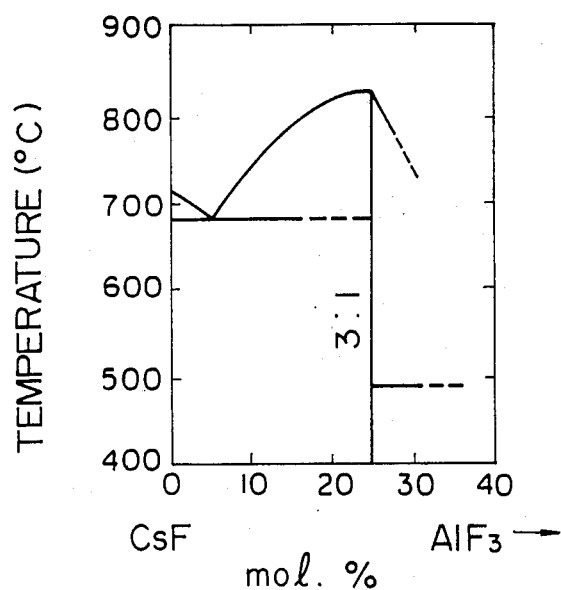
FIG. 1 is a phase diagram of the system $CsF-AlF_3$.

According to this invention, an aluminum material is brought into contact with a coating solution containing cesium (Cs) and fluorine (F) ions, whereby a flux layer is chemically coated on the aluminum material.

The term "aluminum material" as herein used means aluminum or an aluminum alloy. The aluminum alloy is an alloy composed of aluminum and at least one other metal, such as silicon (Si), copper (Cu), manganese (Mn), zinc (Zn), titanium (Ti), chromium (Cr), zirconium (Zr) or magnesium (Mg). Specific examples include those alloys which are designated as A3003, A3004 and A7072 in Japanese Industrial Standard (JIS). The term also means aluminum or an aluminum alloy having a surface covered by another alloy having a melting point which is 10° C. to 100° C. lower than the base metal or alloy, for example, a eutectic alloy of aluminum and silicon having a silicon content of from 7 to 12% by weight. Specific examples include a brazing sheet comprising a sheet of A3003 alloy and a layer of A4343 alloy clad thereon, and designated as, for example, BA12PC.

The coating solution can be prepared by a variety of methods. One of them is to dissolve cesium fluoride (CsF) and hydrogen fluoride (HF) in water. Another example is to dissolve a carbonate or hydroxide of cesium in water and add hydrogen fluoride. Still another example is to dissolve an acidic fluoride of cesium in water. The method is not restricted to the above.

The aluminum material is dipped in the coating solution, or otherwise brought into contact therewith. The cesium and fluorine ions in the solution react with aluminum in the material and form therewith a layer comprising at least one cesium fluoroaluminate complex or a mixture of at least one cesium fluoroaluminate complex and aluminum fluoride (hereinafter referred to as fluxing compound) bonded strongly with the surface of the aluminum material. The cesium fluoroaluminate complex includes a series of substances, such as $Cs_3AlF_6$, $CsAlF_4$ and $Cs_2AlF_5 \cdot H_2O$, which comprises cesium (Cs), aluminum (Al) and fluorine (F).

The coating solution must include cesium and fluorine ions. The solution preferably contains 0.01 to 1.0 mol of cesium ions and 0.02 to 2.0 mols of fluorine ions per liter and has a pH of 2 to 6 in order to form efficiently a chemically coated layer of a fluxing compound having a high flux effect. If the solution contains smaller quantities of cesium and fluorine ions, the chemical reaction proceeds so slowly that an undesirably long time is required for forming a sufficiently large amount of a fluxing compound for obtaining an effective flux. No increase of cesium and fluorine ions over the ranges hereinabove stated is useful, since it does not bring about any corresponding increase in the amount of the fluxing compound which is formed. If the solution has a pH above 6, it reacts with aluminum only at an undesirably low rate. The use of a solution having a pH below 2 should also be avoided, since it heavily etches the aluminum material and forms an undesirably rough surface thereon. In order to adjust the pH of the solution, it is preferable to add hydrogen fluoride, as it is one of the substances used to prepare the solution.

The aluminum material may be dipped in the solution as hereinabove stated. It is also effective to coat or spray the solution on at least that portion of the aluminum material which is to be brazed to another material. In this case, a relatively large quantity of the solution should be used to supply a sufficiently large quantity of cesium and fluorine ions.

If the aluminum material is brought into contact with the solution by dipping or otherwise, the solution, which contains a mixture of cesium and fluorine ions, destroys an oxide film on the surface of the aluminum material, and the cesium and fluorine ions react with the aluminum ions in the material to form a chemically-coated layer of a fluxing compound on the surface of the material. The formation of the layer depends on the temperature of the solution. A satisfactory chemical reaction takes place, even if the solution is at room temperature. It is, however, more effective to use a solution having a temperature of from 40° C. to 70° C. in order to remove the oxide film from the aluminum material completely and rapidly, so that the resulting fluxing compound may form a layer bonded still more strongly to the surface of the aluminum material.

The solution may be applied to the aluminum material before it is formed into a particular shape or assembled into a particular object, or thereafter. The aluminum material can be degreased with an organic solvent, such as trichloroethylene, or otherwise cleaned before it is brought into contact with the solution.

The length of time for which the aluminum material should be maintained in contact with the solution depends on various factors, including the cesium and fluorine ion concentrations of the solution, its pH and its temperature. It is, however, usually in the range of, say, 0.5 to five minutes.

The cesium fluoroaluminate resulting from the chemical reaction as hereinabove described is a complex $CsF-AlF_3$. It appears to have complicated structures, as is obvious from FIG. 1, which is a phase diagram of the system $CsF-AlF_3$ [Zeitschrift fuer Anorganische und Allgeneine Chemie, 81,357 (1913)]. The phase diagram of any complexes containing more than 25 mol % of $AlF_3$ is not clearly known as shown in FIG. 1.

The inventors of this invention tried to identify this complex salt by X-ray diffraction, but could not identify it, since none of the chemically-coated layers showed a diffraction pattern coinciding with that of any substance having a known crystal structure, such as $Cs_3AlF_6$ or $CsAlF_4$. $CsF-AlF_3$ complexes have an extremely complicated phase equilibrium pattern, i.e. the complexes can take various crystal forms.

The fluxing compound melts, or begins to melt, at a temperature of 450° C. to 480° C. when its molar ratio of $AlF_3/CsF$ is in the range of 67/33 to 26/74. The melted fluxing compound removes the oxide film from the surface of the aluminum material to enable a brazing alloy to flow satisfactorily thereon. It does not exert any adverse effect on aluminum.

The fluxing compound can also be formed if the aluminum material in the solution is employed as an anode, and if an electric current is supplied thereto. The cathode used under these circumstances is a material having a surface area equal to that of the anode, and which is not ionized in the solution. Carbon is a typical example.

The formation of the fluxing compound can also be carried out by employing an alternating current. If an AC voltage is applied to two pieces of aluminum material, a fluxing compound is formed on the material having a positive voltage as compared with the other piece, while no coating is formed on the material of negative voltage as compared with the other one.

The formation of the fluxing compound takes place at a lower rate when either a DC or AC voltage is applied, than when no voltage is applied. Thus, the use of an electric current is effective for promoting the formation of a chemically coated layer composed of a desired quantity of a fluxing compound.

Some unreacted cesium and fluorine ions remain on the surface of the aluminum material subjected to the chemical conversion coating. Those ions can be washed away in water, but do not cause any problem later, even if they are not removed.

The aluminum material can, then, be dried so that water may be removed from its surface. This step is effective for causing the remaining ions to react with aluminum to form an additional fluxing compound, even when it is not washed as hereinabove stated. The material can be allowed to dry in the open air, though this method requires a relatively long time. Therefore, it is effective to blow air having a temperature ranging from ordinary temperature to 100° C. against the material. It is still more effective to employ air having a temperature of 100° C. to 200° C., as it removes water from the fluxing compound and heats it to form a coated layer united more strongly with the surface of the aluminum material. The complete drying of the material is also desirable from a standpoint of avoiding (during brazing) generation of water vapor which will raise the dewpoint of furnace atmosphere. It is also advantageous from the standpoint of avoiding the generation of harmful hydrogen fluoride vapor.

The chemically-coated layer on the aluminum material preferably contains approximately 0.1 to 5 g of the fluxing compound per square meter. This quantity renders it effective as a brazing flux.

The chemically-coated layer may be formed on the aluminum material in its original shape, for example, in the form of a wire, plate or block. Alternatively, it can be formed after the material has been formed into a part having a desired shape, such as a cooling water tube or fin for an automobile radiator, or after any such part has been combined with another part to form a temporarily assembled object which is ready for brazing.

If the flux layer is formed on the aluminum material in its original shape, it is, then, worked into a desired shape and combined with another material to prepare a temporarily assembled object. The material with which it can be combined is an aluminum material which may, or may not, have a chemically-coated flux layer formed thereon, or to which a flux has been applied in an ordinary way. The flux layer is so strongly united with the material that it does not substantially peel away when the material is worked. A flux layer containing 0.1 to 3 g of a fluxing compound per square meter is, among others, capable of withstanding considerable hard work. If the layer contains over 5 g of the fluxing compound per square meter, care should be taken to avoid any peeling thereof when bending the material greatly.

The temporarily assembled object has two or more portions at which its constituent parts should be brazed together. It is necessary to apply a brazing alloy to each of those portions before subjecting the object to the brazing operation. In this connection, it is effective and desirable to employ as at least one of its constituent parts a material on which a brazing alloy is clad before they are assembled. Alternatively, it is, of course, possible to apply a brazing alloy in the form of a rod, sheet, wire or powder to each of such portions.

A fluxing compound may be formed on the brazing alloy, too, as hereinbefore described, before it is applied to the parts to be brazed. The brazing alloy preferably has a melting point which is about 10° C. to 100° C. higher than that of the flux. It is usual to employ a eutectic alloy of aluminum and silicon having a silicon content of from 7 to 12% by weight (e.g., A4343 or A4047 according to the designation of JIS). It is, however, possible to use also an alloy having a lower melting point, such as an Al-Si-Cu alloy (A4145) which begins to melt at a temperature of about 521° C., or an Al-Si-Cu-Zn alloy which begins to melt at about 516° C.

After the brazing alloy has been applied, each of those portions at which the parts are to be brazed is heated by a torch or a heating furnace. The furnace preferably contains a non-oxidizing atmosphere, such as nitrogen, though a furnace containing atmospheric air can also be used. If the material is heated, the fluxing compound first melts to exhibit a flux effect. It reacts with $Al_2O_3$ on the surface of the aluminum material and removes it therefrom. This effect manifests itself, even if the aluminum material may contain magnesium. The fluxing compound does not react with aluminum.

It is not clear why the fluxing compound is effective as a flux for brazing an aluminum material containing magnesium, too. It is, however, likely that as it has a lower melting point than any conventional fluoride flux, it may prevent the vaporization of magnesium from the aluminum material before the brazing alloy begins to flow, or that it may dissolve the magnesium fluoride ($MgF_2$) which prevents the flow of the brazing alloy.

If the temperature is further raised, the brazing alloy melts and flows satisfactorily on the surface of the aluminum material to penetrate all of those portions at which the parts are to be brazed.

The invention will now be described more specifically with reference to a plurality of examples.

EXAMPLE 1

Figure 2:
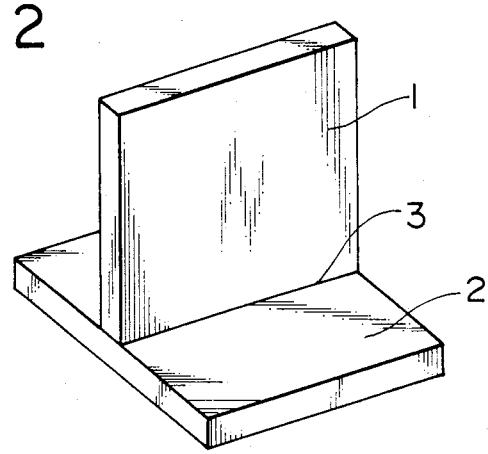
FIG. 2 is a perspective view of the materials brazed in EXAMPLE 1.
Figure 3:
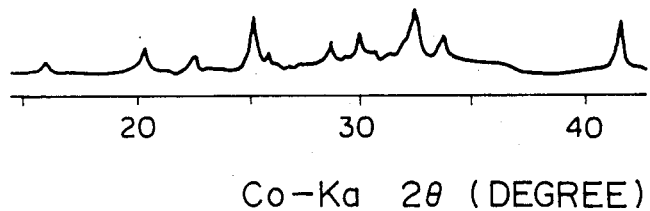
FIG. 3 shows the X-ray diffraction pattern of the chemically coated flux layer formed in EXAMPLE 1.
Figure 4:
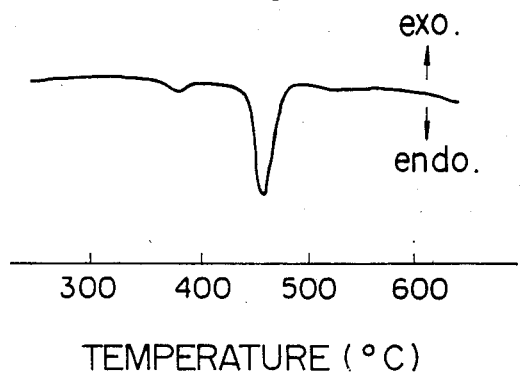
FIG. 4 is a graph showing the results of thermal analysis of the flux layer formed in EXAMPLE 1.

A plurality of brazing sheets 1 (designated by JIS as BA12PC) and an equal number of sheets of aluminum material 2 containing 0.8 to 1.2% by weight of magnesium (designated by JIS as A6061) were chemically treated under the conditions shown at Run Numbers 1 to 6 in TABLE 1. Each of the brazing sheets 1 had a pair of surfaces clad with an aluminum alloy containing 7% by weight of silicon. It had a width of 2 cm, a length of 3 cm and a thickness of 1.6 mm. Each of the sheets 2 was 3 cm square and had a thickness of 1.0 mm. Each brazing sheet 1 and one of the sheets 2 were put together to form a temporarily assembled object having a brazing joint 3 as shown in FIG. 2. The chemical analysis of the flux layer formed for Run No. 1 indicated that it had an Al/Cs atomic ratio of 33/67. The results of its X-ray diffraction are shown in FIG. 3 by way of example, and the results of its thermal analysis in FIG. 4.

Figure 5:
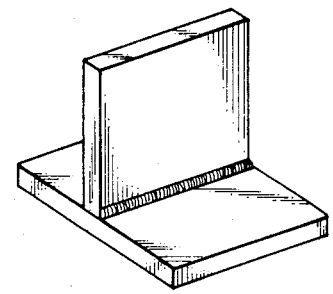
FIG. 5 is a perspective view of the materials brazed in EXAMPLE 1 and having a satisfactory fillet formed thereon.
Figure 6:
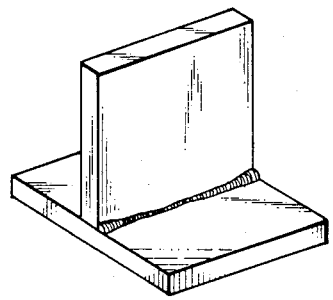
FIG. 6 is a perspective view of the materials brazed in EXAMPLE 1 and having a substantially satisfactory fillet formed thereon.

The object was held at 610° C. for two minutes in a furnace having a nitrogen atmosphere, and allowed to cool outside the furnace. A fillet was formed at the joint 3 by a brazing alloy. Two shapes of fillets were formed. One of them was very satisfactory with a uniform width as shown in FIG. 5. The other is shown in FIG. 6, and was also satisfactory, though its width was not uniform. The right column in TABLE 1 shows the results of evaluation of the fillet formed under the different conditions.

Run No. C1 is a comparative example in which a conventional potassium fluoroaluminate flux having an $AlF_3/KF$ molar ratio of 45/55 and in the form of a powder having a particle size of 200 mesh was applied in a quantity of 3 g/m² to the surface of an aluminum material. No satisfactory brazing was possible, as the brazing alloy failed to flow properly.

TABLE 1

| | Conditions of chemical coating treatment | | | | |
|---|---|---|---|---|---|
| Run No. | Composition of solution (mol/liter) | pH | Temperature (°C.) | Time (min.) | Evaluation |
| 1 | $CsHF_2$: 1.0 | 3.0 | 20 | 1 | Satisfactory |
| 2 | $CsHF_2$: 0.01 | 4.0 | 60 | 2 | Substantially satisfactory |
| 3 | Cs(OH): 0.2 HF: 0.25 | 3.5 | 20 | 1 | Satisfactory |
| 4 | CsF: 0.1 HF: 0.1 | 3.2 | 20 | 1 | Satisfactory |
| 5 | CsF: 0.2 HF: 0.01 | 6.0 | 60 | 2 | Substantially satisfactory |
| 6 | CsF: 0.2 HF: 0.8 | 2.0 | 20 | 0.5 | Substantially satisfactory |
| C1 | $KF-AlF_3$ flux | | | | Unsatisfactory |

EXAMPLE 2

Figure 7:
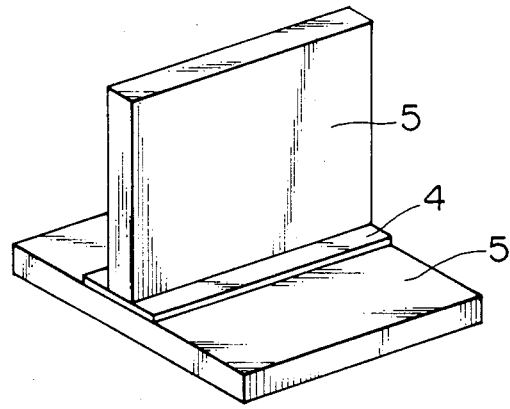
FIG. 7 is a perspective view of the assembled materials employed in EXAMPLE 2.

A plurality of 3 cm square, 1.0 mm thick sheets 5 of an aluminum alloy designated by JIS as A3004 were chemically treated under the conditions shown in TABLE 2 at Run Nos. 7 to 9 according to this invention, and at C2 to C4 for comparative purposes. Each two of the sheets 5 were put together into a T-shaped object having therebetween a degreased brazing alloy 4 in the form of a strip having a width of 0.5 cm, a length of 3 cm and a thickness of 0.2 mm, as shown in FIG. 7. The brazing alloy had been degreased by trichloroethylene. Each object was held at the temperature shown in TABLE 2 for two minutes in a furnace filled with nitrogen, whereby the two sheets were brazed together. The procedure of EXAMPLE 1 was repeated for evaluating the resulting fillet. The results are shown in the right column of TABLE 2.

TABLE 2

| | | Conditions of chemical coating treatment | | | | |
|---|---|---|---|---|---|---|
| Run No. | Brazing alloy (wt. %) | Composition of solution (mol/liter) | pH | Temp. (°C.) | Time (min.) | Brazing temp. (°C.) | Evaluation |
| 7 | Al—10Si | $CsHF_2$: 0.1 | 3.5 | 20 | 1 | 610 | Satisfactory |

TABLE 2-continued

| Run No. | Brazing alloy (wt. %) | Conditions of chemical coating treatment | | | | Brazing temp. (°C.) | Evaluation |
|---|---|---|---|---|---|---|---|
| | | Composition of solution (mol/liter) | pH | Temp. (°C.) | Time (min.) | | |
| C2 | Al—10Si | $KHF_2$: 0.1 | 3.0 | 20 | 1 | 610 | Unsatisfactory |
| 8 | Al—10Si—4Cu—10Zn | $CsHF_2$: 1.0 | 3.5 | 20 | 1 | 580 | Satisfactory |
| C3 | Al—10Si—4Cu—10Zn | $KHF_2$: 1.0 | 3.0 | 20 | 1 | 580 | Unsatisfactory |
| 9 | Al—75Zn | CsF: 1.0 HF: 1.0 | 3.0 | 20 | 1 | 500 | Satisfactory |
| C4 | Al—75Zn | KF: 1.0 HF: 1.0 | 3.0 | 20 | 1 | 500 | Unsatisfactory |

What is claimed is:

1. A method of brazing an aluminum material which comprises:
bringing at least a portion (desired for brazing) of an aluminum material into contact with a coating solution containing cesium and fluorine ions to form on the surface of said material a chemically-coated flux layer composed of a material selected from the group consisting of cesium fluoroaluminate and a mixture of cesium fluoroaluminate and aluminum fluoride; and
heating said portion to join said material to another material with a brazing alloy at a temperature lower than the melting point of said aluminum material and higher than that of said brazing alloy.

2. A method according to claim 1, wherein said solution contains from 0.01 to 0.1 mol of cesium ions and from 0.02 to 2.0 mols of fluorine ions per liter and has a pH of 2 to 6.

3. A method according to claim 1, wherein said solution is an aqueous solution containing cesium hydrogenfluoride ($CsHF_2$).

4. A method according to claim 1, wherein said solution is selected from an aqueous solution containing cesium fluoride (CsF) and hydrogen fluoride (HF), an aqueous solution containing cesium hydroxide (CsOH) and hydrogen fluoride (HF), and an aqueous solution containing cesium carbonate ($Cs_2CO_3$) and hydrogen fluoride (HF).

5. A method according to claim 1, wherein said flux layer is formed by electrolysis.

6. A method according to claim 1, wherein the coating solution is an aqueous solution containing cesium fluoride (CsF) and hydrogen fluoride (HF).

7. A method according to claim 1, wherein the coating solution is an aqueous solution containing cesium hydroxide (CsOH) and hydrogen fluoride (HF).

8. A method according to claim 1, wherein the coating solution is an aqueous solution containing cesium carbonate ($Cs_2CO_3$) and hydrogen fluoride (HF).

* * * * *